March 20, 1951 C. H. HOEPPNER ET AL 2,545,464

PULSE GROUP DISCRIMINATOR

Filed Oct. 9, 1945 3 Sheets-Sheet 1

Inventors
CONRAD H. HOEPPNER
CARL HARRISON SMITH Jr.

By Ralph L. Chappell

Attorney

PULSE GROUP DISCRIMINATOR

Inventors
CONRAD H. HOEPPNER
CARL HARRISON SMITH Jr.

By Ralph L. Chappell
Attorney

March 20, 1951 C. H. HOEPPNER ET AL 2,545,464

PULSE GROUP DISCRIMINATOR

Filed Oct. 9, 1945 3 Sheets-Sheet 3

Inventors
CONRAD H. HOEPPNER
CARL HARRISON SMITH Jr.

By Ralph L. Chappell
Attorney

Patented Mar. 20, 1951 2,545,464

UNITED STATES PATENT OFFICE 2,545,464

PULSE GROUP DISCRIMINATOR

Conrad H. Hoeppner, Washington, D. C., and Carl Harrison Smith, Jr., Arlington, Va.

Application October 9, 1945, Serial No. 621,400

8 Claims. (Cl. 250—27)

(Granted under the act of March 3, 1883, as amended April 30, 1928; 370 O. G. 757)

This invention relates in general to electronic circuits having discriminatory response characteristics and in particular to an electronic circuit for pulse group structure discrimination.

In radio, radar, television, and other electronic fields, it frequently occurs that a number of different potential variations may exist at the input to a component electronic circuit either fortuitously or by intention. If all of such variations are not to be impressed upon the component circuit, it is necessary to provide an intervening circuit with the ability to discriminate between those variations intended for ultimate application to the component circuit and those variations the effect of which would be undesirable. Some characteristic or characteristics of the potential variations must be selected as a basis for pulse discrimination and among such characteristics are time duration, polarity, rate of change, and amplitude.

Given such a basis and a suitable intervening circuit, many useful applications may result. For example, a means of pulse coding is provided in which intelligence is conveyed by means of electrical impulses endowed with the chosen characteristic in the form in which it will be favored by the receiver of the message. All those electrical impulses not so endowed, whether they be deliberately introduced so as to disguse a communication for secrecy purposes or reach the receiver from man-made or natural sources so as to constitute accidental or deliberate interference, are rejected by the intervening circuit. An obvious extension of such a pulse coding system is to provide a receiver with a plurality of intervening circuits, each so constructed as to select and favor its particular type of electrical impulses. In this way a multiplicity of communication channels may be provided. The endowment of electrical impulses with the chosen characteristic in the form in which they will be favored does not necessarily operate to prevent a variation in another characteristic which can be put to a useful purpose. Thus, pulses which may be restricted as to time duration and spacing so as to be favored by a pulse group discrimination circuit, may also be amplitude modulated so as to convey intelligence or provide a second means of discrimination.

It is an object of this invention to provide a circuit which is responsive only to pulse groups comprising pulses of a predetermined duration.

It is another object of this invention to provide a circuit which is responsive only to pulse groups comprising initial pulses of one predetermined duration and succeeding pulses of another predetermined duration.

It is another object of this invention to provide a circuit which is responsive only to pulse groups comprising initial pulses of one predetermined duration and succeeding pulses of another predetermined duration separated in time from said initial pulses by not more than a predetermined spacing.

It is another object of this invention to provide a circuit which is responsive only to pulse groups comprising initial pulses of one predetermined duration and succeeding pulses of another predetermined duration separated in time from said initial pulses by not less than one predetermined spacing and by not more than another predetermined spacing.

It is another object of this invention to provide a circuit which may be employed between a source of potential variations or electrical impulses and the receiver thereof as an intervening circuit which shields from such receiver all variations or pulse groups except those having a certain definite group structure.

Other objects and features of this invention will become apparent upon a careful consideration of the following detailed description when taken together with the accompanying drawings in which.

Figures 1, 2:
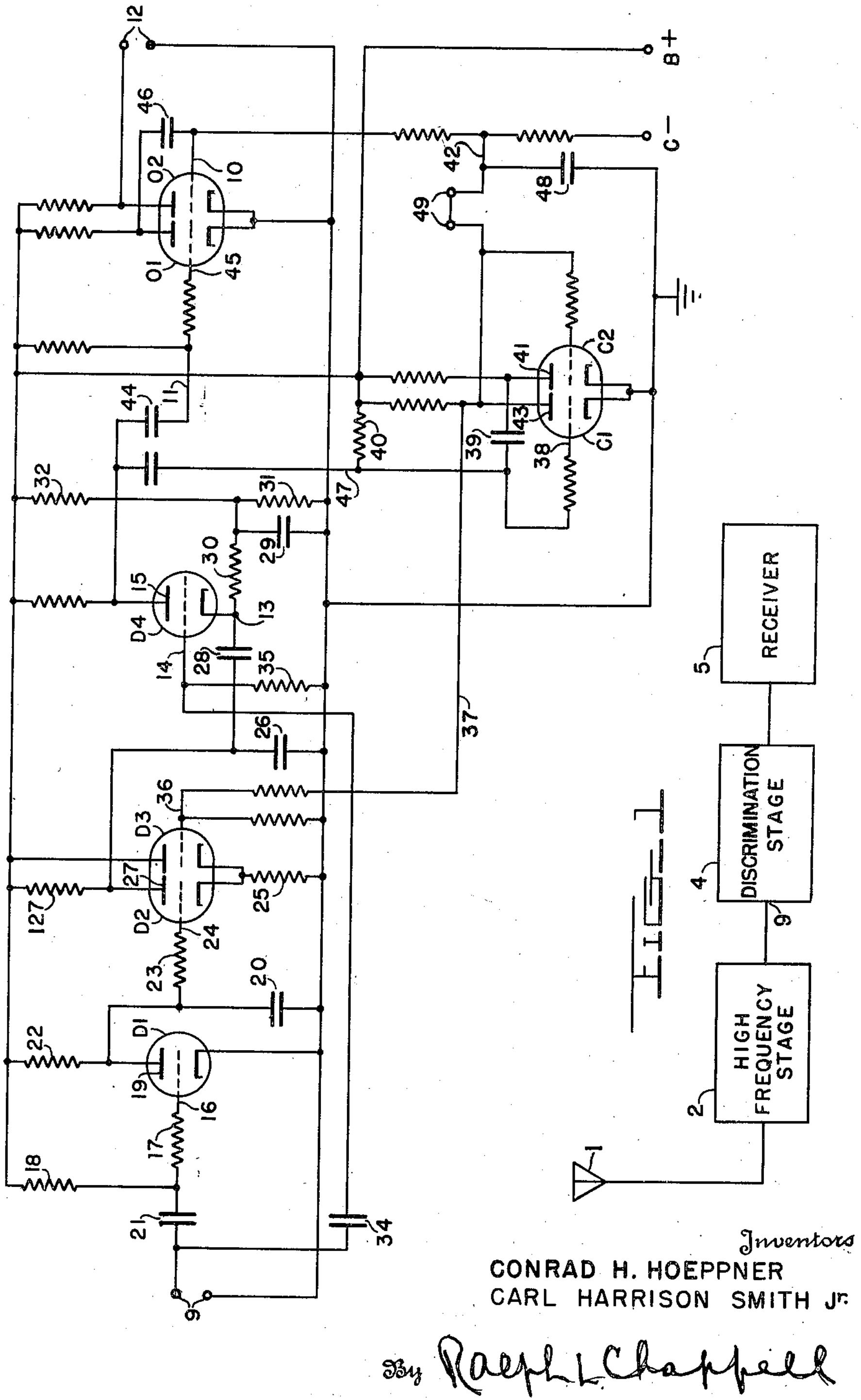
Fig. 1 is a simple block diagram of a pulse receiving system utilizing one embodiment of this invention.
Fig. 2 is the circuit diagram of one embodiment of this invention.

Reference is now had in particular to Fig. 1 which is illustrative of a pulse receiving system wherein a discrimination circuit is employed to repulse undesired video signals in a pulse receiving system. Pulses or bursts of high frequency energy received by antenna 1, amplified and detected by high frequency stage 2 are impressed, in the form of the envelope of the high frequency pulses of energy, to input 9 of discrimination stage 4. Since the pulse groups of high frequency energy reaching antenna 1 may comprise not only a desired signal but also man-made and fortuitous interfering signals of a frequency which high frequency stage 2 will not reject, and since high frequency stage 2 may itself be a source of interfering signal, it is the function of discrimination stage 4 to shield from receiver 5 all pulses not having the group structure characteristics of the desired signal. The output circuit of high frequency stage 2, not shown, is so constructed that only signals of negative polarity and steep leading and trailing edges are applied to input 9. Further, these signals are all of the same amplitude, the result being that, as they are applied to discrimination stage 4, their only substantial difference lies in the characteristic of time duration.

In general, the pulse group discrimination taught by this invention is accomplished by creating, in response to the initial pulses of pulse groups, periods of responsiveness during which succeeding pulses cause output signals and by requiring that both the initial pulses and the succeeding pulses have certain definite durations. These pulse durations may be the same or they may differ according to the particular requirements and additional conditions as to spacing between initial and succeeding signals may be imposed if desired. The exact form taken by the circuit employed depends upon the degree of discrimination and the nature of the output signals required. In all forms, a pulse width discriminator, to which each pulse of the pulse group is applied, is employed. In those forms in which a high degree of discrimination is required, the pulse width discriminator includes a means for predeterminedly controlling the width of pulses of which it responds. An output stage, which includes means by which it may be rendered operable or inoperable, receives the signals generated by the discriminator to indicate the receipt of a pulse of the width to be favored, and amplifies these signals to produce pulses bespeaking the receipt of a pulse group of the desired structure. A controlling stage, also responsive to the width discriminator functions to render the output stage operable only during selected intervals and to determine the pulse duration to which the width discriminator responds.

In the embodiment of the Fig. 2, which is representative of a discrimination stage such as stage 4 of Fig. 1, triode vacuum tubes D1 and D4 and dual triode vacuum tube element D2 together with their immediately associated circuit components, comprise a pulse width discriminating circuit which operates in a manner described in our copending application Serial No. 621,401, entitled Pulse Width Discriminator, filed October 9, 1945. Groups of pulses, including both those which represent desired signals and those which constitute interfering signals are applied to the circuit at input terminals 9. In a manner which will be explained in the following paragraphs, tube element D3 represents the means by which the duration of the pulses favored by the width discriminator may be controlled. Dual triode tube elements O1 and O2 comprise the vacuum tube elements of an output stage which may be rendered operable or inoperable according to the bias supplied to grid 10 of tube O2. Signals from the width discriminator reach the output stage through lead 11 and are amplified, when the stage is operable, to produce output pulses at terminals 12. Dual triode tube elements C1 and C2 comprise the vacuum tube elements of a controlling stage which, in this embodiment, consists of a "one shot" multivibrator. This controlling stage functions both to establish the bias at grid 10 of the output stage and to establish, by means of tube D3, the pulse width favored by the pulse width discriminator. The pulse width discriminator, the output stage and the controlling stage function together to receive pulse groups of various structures at terminals 9 and to produce output pulses at terminals 12 only in response to those of the received pulse groups which have a predetermined structure.

Figure 3:
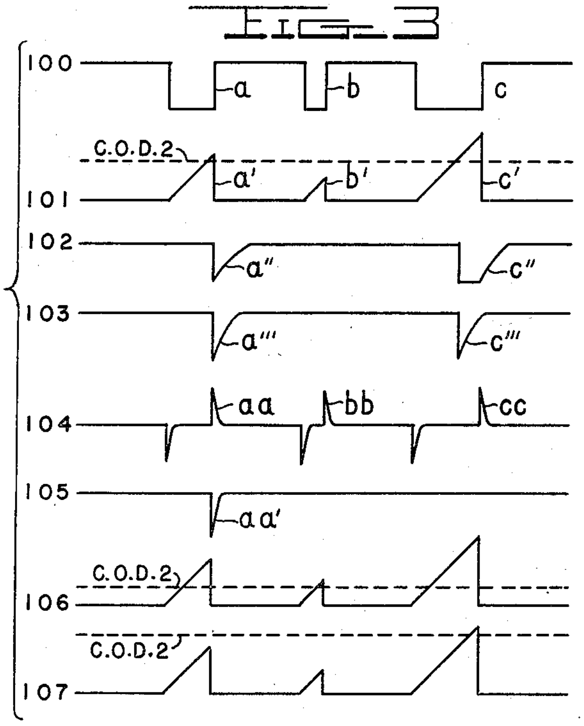
Figs. 3, 4 and 5 are a series of waveforms useful in explaining the operation of the circuit of Fig. 2.

In particular, in the circuit of Fig. 2, the pulse width discriminator, comprising tubes D1, D2, D3 and D4, operates to generate at cathode 13 of tube D4 a negative pulse, which for its duration, places tube D4 in a condition to conduct in response to a positive signal on grid 14. This negative cathode pulse is generated a predetermined interval of time after the leading edge of an applied pulse at input 9 so that tube D4 is rendered responsive to signals at grid 14 only a predetermined interval after the leading edge of an incoming pulse. The incoming pulses are differentiated by a time constant circuit so as to generate a positive pulse for application to grid 14 from the incoming pulse trailing edge. This trailing edge positive pulse is separated in time from the incoming pulse leading edge by the duration of the pulse and it is only when that duration is such as to cause the trailing edge positive pulse to arrive at grid 14 during the interval represented by the negative pulse applied to cathode 13 and tube D4 conducts to generate an output signal at anode 15. This action may be better understood by reference to the waveforms illustrated in Fig. 3. These waveforms consist of plots of the voltage variations at various points in the width discriminator on the vertical axis against time on the horizontal axis. Waveform 100 is representative of a series of pulses (not pulse groups) *a*, *b*, and *c*, applied to input 9. Of this series, only pulse *a* is of the duration which the width discriminator is set to favor while pulse *b* is too narrow and pulse *c* too wide. As hereinbefore described, all such pulses are of negative polarity, possess steep leading and trailing edges and are of a uniform amplitude sufficient to drive grid 16 of tube D1 below cutoff and hold it cutoff for the duration of the pulses. By virtue of its connection to B+ potential through resistors 17 and 18, grid 16 is at substantially cathode potential and D1 is conducting strongly in the absence of input signals at terminals 9. Strong conduction by tube D1 places its anode 19 only a slight potential above ground which condition corresponds to a minimum charge on capacitor 20. The circuit coupling signals to grid 16 of tube D1, comprising capacitor 21 and resistance 18, is of long time constant characteristics so that capacitor 21 assumes negligible charge during any input pulse.

Pulse *a* cuts off the flow of current in tube D1 and capacitor 20 immediately undertakes to charge up to B+ potential through resistance 22 in the plate circuit of D1. Resistance 22 and capacitor 20 have been so chosen that the charge on capacitor 20, and hence the potential applied through resistor 23 to grid 24 of tube D2 rises in a nearly linear manner during any pulse applied at input 9. This action is illustrated by waveform 101 in which sawtooth pulse *a'* represents the potential appearing across capacitor 20 and hence at grid 24 of tube D2 in response to pulse *a*. Tube D2, a tube having sharp cutoff characteristics, is so biased by the floor of current through tube D3 and common cathode resistor 25 that it remains non-conducting until the signal at its grid 24 reaches the level C. O. D2 superposed on waveform 101. Pulse a, which is of sufficient duration to cause pulse a' to exceed level C. O. D2, therefore causes conduction by D2. When conducting, tube D2 represents a low resistance discharge path for capacitor 26 connected between anode 27 of tube D2 and ground so that it rapidly loses the high charge which it ordinarily holds during the quiescent non-conduction of tube D2. D2 is, of course, blocked again at the trailing edge of the applied pulse but capacitor 26 must then charge through resistor 127 in the plate circuit of tube D2. Resistor 127 is so chosen as to permit only slow charging of capacitor 26 so that conduction by tube D2 results in the generation of a pulse having a steep negative going leading edge, a gradual positive going trailing edge, and a limited amplitude as illustrated by pulse a'' of waveform 102. The differentiation of this pulse by means of capacitor 28, capacitor 29, and resistances 30, 31 and 32 results in the application to cathode 13 of tube D4 of a negative pulse each time tube D2 is driven conducting which always occurs a predetermined period of time after the leading edge of the incoming pulse at input 9. This differentiated negative pulse at the cathode of tube D4 is represented by pulse a''' of waveform 103. The maximum amplitude of this pulse, while sufficient to remove most of the cathode bias supplied to tube D4 by the voltage divider network comprising resistors 31 and 32, is still insufficient to cause conduction by tube D4 as long as its grid 14 is held at ground potential or below. Thus an incoming pulse removes, a predetermined interval of time after its leading edge, enough of the bias at the cathode of tube D4 to render tube D4 responsive to positive signals impressed upon its grid 14. The incoming pulse at input 9 also effects tube D4 by way of the differentiating circuit comprising capacitor 34 and resistance 35. This differentiating circuit generates a negative pulse from the leading edge of the incoming pulse which is impotent since tube D4 is held non-conducting by its cathode bias. The positive pulse which it generates from the incoming pulse trailing edge is capable of rendering tube D4 conducting, however, provided it is generated at a time when the cathode bias is removed as described above. Trailing edge positive pulse aa of waveform 104 represents the effective portion of differentiated incoming pulse a. Since it arrives at grid 14 of tube D4 synchronously with pulse a''' at cathode 13, tube D4 is rendered conducting to produce, at anode 15, the sharp negative pulse represented by pulse aa' of waveform 105.

In a similar manner, incoming pulse b cuts off tube D1 and causes the generation of sawtooth pulse b'. Because of the short duration of pulse b, pulse b' fails to reach level C. O. D2 necessary to cause conduction by D2. Thus, no negative pulse is generated to remove the cathode bias from tube D4 and pulse b, shorter than the pulse width discriminator is designed to favor, fails to produce any output signal at anode 15.

Pulse c likewise causes the generation of sawtooth pulse c' at the anode of tube D1 which, as in the case of pulse a, causes tube D2 to conduct. The negative pulse c''' which consequently appears at cathode 13 of tube D4 is spaced in time from the leading edge of pulse c as corresponding pulse a''' was spaced from the leading edge of pulse a. Trailing edge positive pulse cc arrives at grid 14 of tube D4 after pulse c''' disappears and pulse c, longer in duration than pulse a therefore fails to produce an output signal at anode 15.

It will be seen from an examination of these waveforms that the bias on tube D2, represented by level C. O. D2 of waveform 101 may be altered to alter the width of a pulse which will cause an outpu signal at anode 15. If, for example, level C. O. D2 were lowered to appear as in waveform 106, pulse b only would cause a signal at anode 15, while pulses a and c would both be too wide to pass the discriminator. If, on the other hand, the bias of tube D2 is increased so as to cause level C. O. D2 to appear as in waveform 107, pulse c only would cause a signal at anode 15 while pulses a and b would both be too narrow.

By reference to Fig. 2, it will be seen that the bias on tube D2 is determined by the amount of current which tube D3 allows to flow through common cathode resistor 25. Further, it will be seen that grid 36 of tube D3 controls the current through tube D3 and therefore represents a means by which the bias of tube D2 and hence the favored pulse width may be controlled.

In the circuit of Fig. 2, the one-shot multivibrator comprising tubes C1 and C2 acts to control the grid bias of tube D3 through lead 37. This one-shot (or delay type) multivibrator has only one stable state of equilibrium (C1 conducting and C2 non-conducting) but will maintain, upon receipt of a negative signal at grid 38 of tube C1, a second state (C1 non-conducting and C2 conducting) for a definite interval of time which may be used for the purpose of changing the grid bias of tube D3 for a predetermined period as hereinafter described. The time interval for which the second state of the mutlivibrator can be maintained is determined by the time constant circuit formed by capacitor 39 and resistance 40. As tubes C1 and C2 are driven into non-conduction and conduction respectively to produce the second state of the multivibrator, plate 41 of tube C2 is thereby driven sharply negative and holds grid 38 of tube C1 below cutoff until capacitor 39 partially discharges through resistance 40. Multivibrator C1 and C2 is triggered out of its quiescent condition of stable equilibrium by signals reaching it through lead 47 from anode 15 of the width discriminator. The positive excursion of anode 43 of tube C1 which occurs when tube C1 is rendered non-conducting is communicated to grid 36 of tube D3 through lead 37 to alter the bias on tube D2 in the manner hereinbefore described. Thus, when multivibrator controlling stage C1 and C2 is in its quiescent condition of stable equilibrium, it establishes the bias of tube D2 at one value such as level C. O. D2 of waveform 101 of Fig. 3. When, however, a pulse of a width which level C O. D2 causes the discriminator to pass. such as pulse a is impressed at input 9, the resulting signal from anode 15 of tube D4 triggers C1 and C2 into the second state of the multivibrator. C1 and C2 then establish, for the period of that second state, an increased bias for tube D2 at a level such as C. O. D2 of waveform 107 of Fig. 3. During that period, only a wider pulse, such as pulse c can cause an output signal at anode 15 of tube D3.

Controlling stage C1 and C2 has another function. During its quiescent condition of stable equilibrium, it impresses on grid 10 of tube O2 through lead 42 a biasing voltage which renders tube O2 incapable of conducting. During the interval of the second state of C1 and C2 however, the positive potential which appears at anode 43 of tube C1 removes just enough of the bias from grid 10 of tube O2 to permit that tube to conduct in response to a positive signal on grid 10.

Reverting now to anode 15 of tube D4, it will be seen that the negative signals which appear at that point in response to pulses which the width discriminator allows to pass, are also communicated, via capacitor 44 to grid 45 of tube O1. Tube O1 inverts and amplifies these signals so that positive signals are applied, through capacitor 46, to grid 10 of tube O2. Only, however, if controlling stage C1 and C2 is in its second state will tube O2 be biased that the positive signal from tube O1 on grid 10 will cause tube O2 to conduct and a pulse group discriminator signal to appear at terminals 12. It will be seen that tube O2 is not in a condition to respond to positive pulses until after controlling stage C1 and C2 has been triggered into its second state of predetermined duration. Thus a single pulse, even though it causes a signal at anode 15, will not cause tube O2 to conduct and an output pulse to appear at terminals 12. A succeeding pulse, the trailing edge of which arrives at a time when C1 and C2 render tube O2 responsive is required to cause an output pulse at terminals 12. Further, this succeeding pulse must have a width such that it will cause a signal at anode 15 of tube D4.

Figure 4:
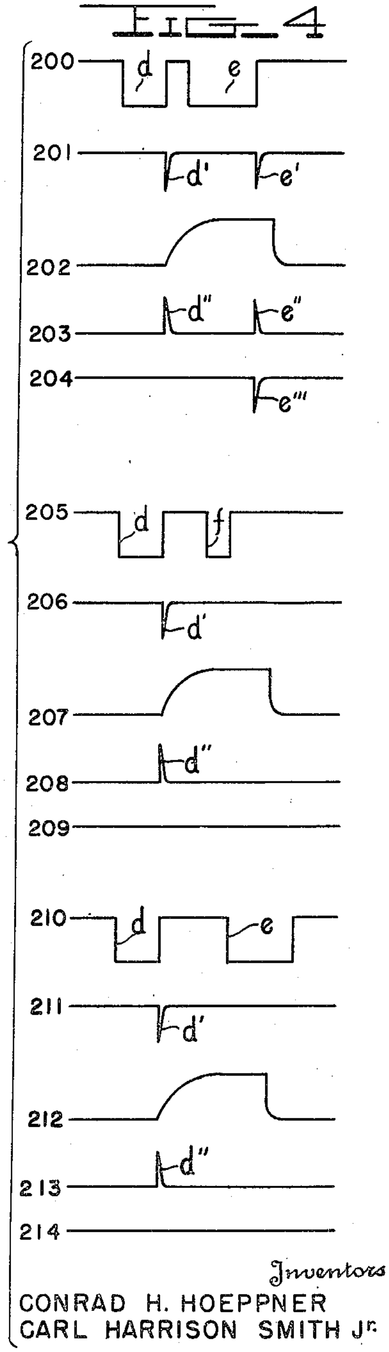

This action is illustrated by the waveforms of Fig. 4 in which waveform 200 is representative of a pulse group applied to input 9 of Fig. 2. Let it be assumed that pulse $d$ of this group is of a width to cause a signal at anode 15 of tube D4 when controlling stage C1 and C2 is in its quiescent state of equilibrium and that pulse $e$ of this group is of a width to cause a signal at anode 15 when C1 and C2 is in its second, temporary, state. These anode 15 signals are represented by $d'$ and $e'$ respectively of waveform 201. Signal $d'$ reaches grid 10 of tube O2 through capacitor 44 and tube O1 in the form of a positive pulse only to find tube O2 rendered inoperable by the bias from controlling stage C1 and C2. Signal $d'$ does, however, reach C1 and C2 through lead 47 to trigger the mutlivibrator into its second state. This second state is characterized by a high potential condition at anode 43 of tube C1 (C1 non-conducting) as illustrated by waveform 202. While the capacitance to ground is ordinarily sufficient to prevent such a rapid buildup of potential at anode 43 that tube O2 is rendered responsive before initial pulse $d'$ disappears, additional capacitance, such as capacitor 48 from anode 43 to ground may be added to produce the sloping leading edge of waveform 202. The pulse of waveform 202 not only serves to render tube O2 responsive but it also is applied through lead 37 to grid 36 of tube D3 to increase the flow of current through that tube. This increased flow of current so increases the bias on tube D2 that succeeding pulse $e$ of longer duration is enabled to produce pulse $e'$ at grid 45 of tube O1 which results in positive pulse $e''$ of waveform 202 at grid 10 of tube O2. Since tube O2 is then responsive and conducts, output pulse $e'''$ of waveform 204 appears at terminals 12 to bespeak the arrival, at input 9, of a pulse group of the structure which the pulse group discriminator was designed to favor.

The rejection of a pulse group containing no pulse of width $d$ is obvious since all pulses of the group would be rejected by the width discriminator. In the case of a pulse group comprising an initial pulse of width $d$ and a succeeding pulse of a width other than that of pulse $e$, such as pulse $f$ of waveform 205 the discrimination is illustrated by waveforms 205 through 209. As before, pulse $d$ triggers the controlling stage C1 and C2 to thereby render tube O2 responsive and to alter the width of the succeeding pulse which will cause a signal at anode 15 of tube D4. Since pulse $f$ is not of the width which will cause that anode 15 signal, it fails to impress a positive pulse on grid 10 of tube O2 and the pulse group comprising pulses $d$ and $f$ is therefore rejected by the pulse group discriminator. In the case of a pulse group comprising an initial pulse of width $d$ and a succeeding pulse of a width $e$ such as to pass the width discriminator during the second state of C1 and C2 but which provides excessive time spacing between pulse $d$ and pulse $e$, the discrimination is illustrated by waveforms 210 through 214. The action of pulse $d$ is the same as in the preceding examples but the trailing edge of pulse $e$ arrives in time too late to be able to pass the width discriminator or to cause conduction by tube O2 since, during pulse $e$, controlling stage C1 and C2 reverts to its quiescent state of equilibrium, biases off tube O2 and reduces the bias on tube D2.

Thus, a pulse group, in order to cause an output signal at terminals 12 must comprise two pulses, each having a distinctive predetermined width and having a spacing not exceeding a predetermined spacing.

If lead 37 to grid 36 of tube D3 had been connected to anode 41 of tube C2 rather than to anode 43 of tube C1, the bias on tube D2 would have been less during the second state of C1 and C2 so that the succeeding pulse would have had to possess a width less than that of the initial pulse of the group in order to cause a signal at anode 15 of tube D3. In such a case, the pulse group discriminator would have passed a pulse group having the structure shown in waveform 205, for example, and would have rejected both waveform 200 and waveform 210.

If the bias of tube D2 had been held at a fixed value, then the pulse group required to pass would have been one comprising two pulses of equal duration.

Figure 5:
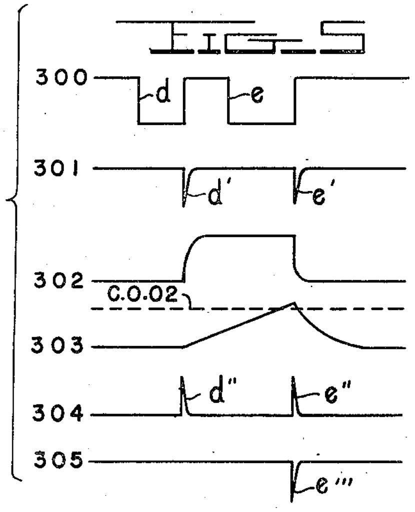

An additional element of discrimination may be added by removing the short between terminals 49 and inserting between those terminals a resistor which increases the length of time required to charge capacitor 48 up to a potential which will render tube O2 responsive. In this way, the second pulse of a pulse group, if it occurs too soon after the initial pulse, will generate a pulse at anode 15 of tube D4 prior to the time tube O2 is rendered responsive. This action is illustrated by the waveforms of Fig. 5 in which waveform 300 is representative of a pulse group composed of pulses $d$ and $e$ of a width to cause signals at anode 15 of tube D4 during the quiescent and second states respectively of controlling stage C1 and C2. Such signals are representative by $d'$ and $e'$ respectively of waveform 301. The positive pulses which they cause to be impressed upon grid 10 of tube O2 are represented by $d''$ and $e''$ respectively of waveform 304. As before, pulse $d''$ is impotent since tube O2 is rendered unresponsive by the bias at its cathode. Pulse $d'$ triggers controlling stage C1 and C2 to form at anode 43 of tube C1 the pulse represented by waveform 302. This pulse at the anode of tube C1 changes the bias on tube D2 as before. The voltage across capacitor 48 is represented by waveform 303 on which level C. O. O2 has been superimposed to indicate the potential to which capacitor 48 must rise before a positive pulse on grid 10 of tube O2 will cause that tube to conduct. It will be seen that, had the spacing between pulses *d* and *e* been less, pulse *e''* would have arrived at grid 10 of tube O2 at a time when that tube was unresponsive. The pulse group discriminator would have rejected the pulse group if the spacing had exceeded that shown on waveform 300 in the same manner as hereinbefore recited.

Thus to the requirement that a pulse group to be favored must comprise two pulses, each having a distinctive predetermined width and having a spacing not exceeding a predetermined spacing is added the requirement that the spacing must not be less than a second predetermined spacing.

To those well versed in the art, the teachings of this invention will suggest a number of variations to suit the requirements of particular situations. For example, if the circuit components of controlling stage C1 and C2, principally capacitor 39 and resistance 40 were chosen such as to extend the second state of the multivibrator, several succeeding pulses, rather than a single succeeding pulse, had they been of a width such as to pass the width discriminator, could have caused output signals at terminals 12. Thus the pulse group discriminator could be used to reject all pulse groups except those comprised of an initial pulse of a predetermined width and one or a plurality of succeeding pulses of a second predetermined width in such a manner as to produce an output pulse in response to each such succeeding pulse.

Figures 6, 7:
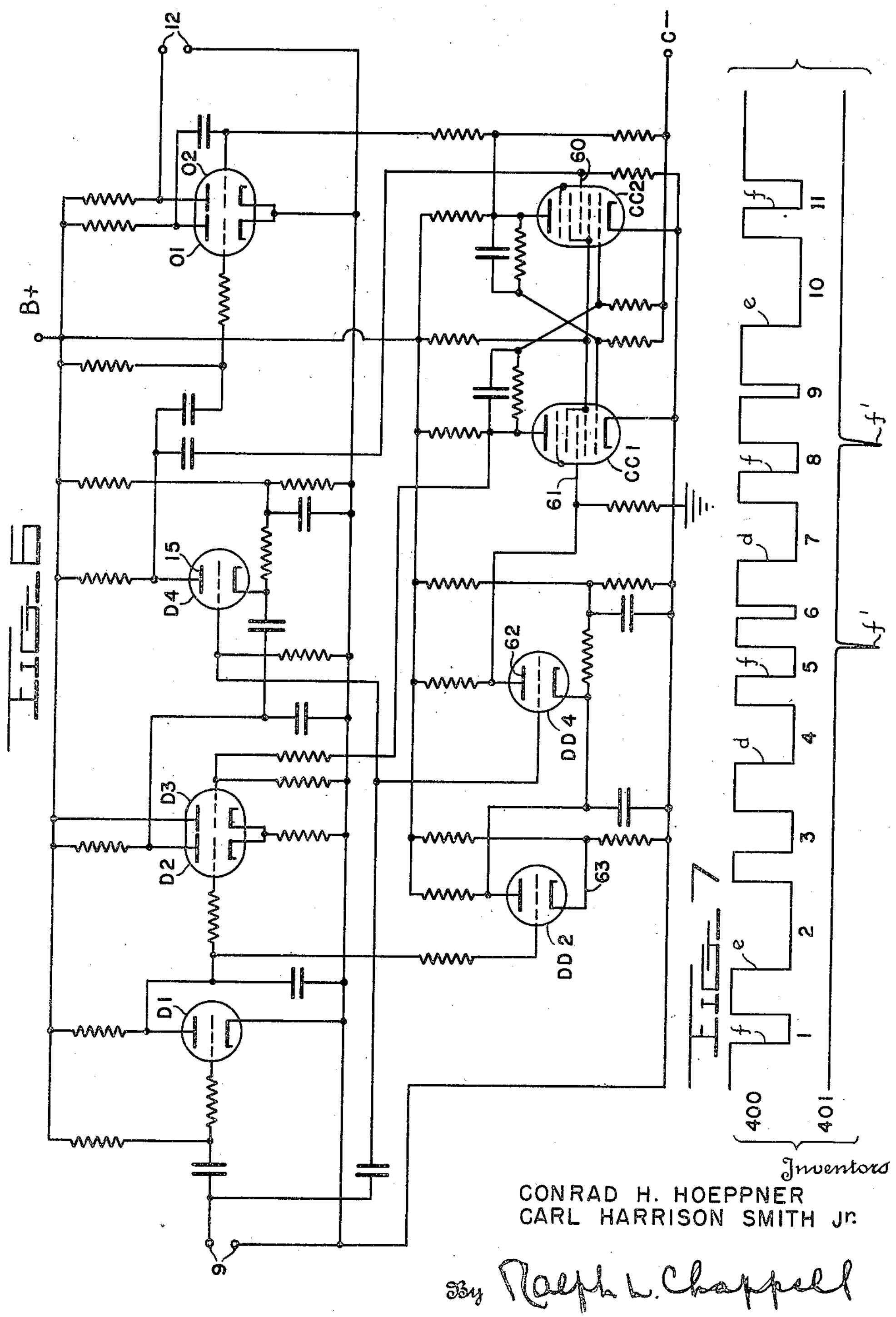
Fig. 6 is the circuit diagram of a variant embodiment of this invention.
Fig. 7 is a series of waveforms useful in explaining the operation of the circuit of Fig. 6.

A variant embodiment which may, under certain circumstances, prove valuable, takes the form of a pulse group discriminator which, in response to an initial pulse of one width, renders itself responsive to any desired number of succeeding pulses of a second width and then, in response to a final pulse of a third width, returns itself to its original condition. This embodiment, which is illustrated in Fig. 6, incorporates a trigger circuit form of multivibrator as the controlling stage rather than a one-shot multivibrator as in the circuit of Fig. 2. In addition, there is added a second width discriminator channel to accommodate the final pulse of the group. In Fig. 6, tubes D1, D2, D3, D4, O1 and O2 perform the same functions as in the circuit of Fig. 2.

Tubes CC1 and CC2 represent the vacuum tube components of a trigger circuit which has two stable states of equilibrium, one in which CC1 is non-conducting and CC2 is conducting and the other in which CC1 is conducting and CC2 non-conducting. It is so designed that it will change from the first of the above described states to the second only in response to a negative signal at grid 60 of tube CC2 and from the second of the states back to the first only in response to a negative signal at grid 61 of tube CC1. Thus the initial pulse of a group having the characteristics to be favored triggers CC1 and CC2 into the second state in which CC1 is conducting and CC2 is non-conducting. The low plate voltage which accompanies conduction by tube CC1 serves to change the width of pulse which will produce an output on anode 15 of tube D4 while the high plate voltage which accompanies non-conduction by CC2 renders tube O2 responsive. An output pulse will then be produced at terminals 12 in response to each of the succeeding pulses having the width established by the changed bias on tube D2 until such time as a pulse of the width which will produce a signal at anode 62 of tube DD4 is received at input 9. The width of this final pulse is established by the fixed bias supplied to cathode 63 of tube DD2. The functioning of the discriminator channel comprising tubes D1, DD2 and DD4 is the same as that of the channel comprising tubes D1, D2 and D4 hereinbefore described.

In Fig. 7, waveform 400 is representative of a series of negative pulses applied to terminals 9 of which pulse width *d* is that which will cause a signal at anode 15 of tube D4 in Fig. 6 when controlling stage CC1 and CC2 is in the state in which CC1 is non-conducting and CC2 conducting. Pulse width *f* is that which will cause a signal at anode 15 of tube D4 when CC1 is conducting and CC2 is non-conducting. Pulse width *e* is that which will cause a signal at anode 62 of tube DD4 regardless of the state existing in the controlling stage.

The first pulse of the series of waveform 400, having width *f* is rejected by both discriminator channels (assuming CC1 and CC2 to be non-conducting and conducting respectively). The second pulse, having width *e*, causes a signal to appear at anode 62 of tube DD4 which is applied to grid 61 of tube CC1. This negative signal on grid 61 is impotent since tube CC1 is in its non-conducting condition. The third pulse of waveform 400 is of a width which both discriminator channels reject under all conditions. The fourth pulse has width *d* which causes a signal at anode 15 of tube D4 and triggers CC1 and CC2. This change in the controlling stage renders tube O2 responsive and changes the width which will cause a signal at anode 15 of tube D4 to that of pulse *f*. The fifth pulse, having width *f* causes a signal at anode 15 of tube D4 and consequently at output terminals 12 as illustrated by *f'* of waveform 401. The sixth and seventh pulses and ninth pulses are rejected by both discriminator channels while the eighth is of width *f* and causes output pulse *f'* at terminals 12. The tenth pulse of width *e* causes a signal at anode 62 of tube DD4 which triggers CC1 and CC2 back into the condition first assumed. The eleventh pulse is rejected since the pulse group discriminator will now remain quiescent until a pulse of width *d* is applied to input 9. It will be apparent that a pulse group discrimination circuit constructed in accordance with the teachings of the invention will have a wide variety of applications in radio, radar, television and other electronic fields whenever discrimination between voltage variations is desirable and the time durations of individual variations in a group of pulses can be used as the basis for such discrimination. It will also be apparent that a pulse group discrimination circuit constructed as taught by this invention may be used in combination with other circuits, also discriminatory in response, whose action is based on other characteristics of the input signal such as amplitude, polarity, or rate of change.

Since certain further changes may be made in the foregoing constructions and different embodiments of the inventions may be made without departing from the scope thereof, it is intended that all matter shown in the accompanying drawings or set forth in the accompanying specification shall be interpreted as illustrative and not in a limiting sense.

The invention described herein may be manufactured and used by or for the Government of the United States of America for governmental purposes without the payment of any royalties thereon or therefor.

What is claimed is:

1. A pulse group discriminator comprising, pulse width discriminator means comprising vacuum tube means generating in response to incoming pulses, pulses which are predeterminedly time related to said incoming pulses, means generating pulses from the trailing edges of said incoming pulses, means combining only those of said first generated pulses and said trailing edge pulses which are synchronous, vacuum tube amplifier means responsive to said synchronously combined pulses so as to produce output pulses in response thereto, and multivibrator means connected to said first named vacuum tube means and responsive to said synchronously combined pulses for altering said time relation between first said generated pulses and said incoming pulses.

2. A pulse group discriminator comprising, pulse width discriminator means comprising vacuum tube means generating in response to incoming pulses, pulses which are predeterminedly time related to said incoming pulses, means generating pulses from the trailing edges of said incoming pulses, means combining only those of said first generated pulses and said trailing edge pulses which are synchronous, vacuum tube amplifier means responsive to said synchronously combined pulses so as to produce output pulses in response thereto, and multivibrator means connected to said first named vacuum tube means and responsive to said synchronously combined pulses for altering said time relation between first said generated pulses and said incoming pulses, said multivibrator means also holding said amplifier means inoperative except when said time relation is so altered.

3. A pulse group discriminator comprising, pulse width discriminator means comprising vacuum tube means generating in response to incoming pulses, pulses which are predeterminedly time related to said incoming pulses, means generating pulses from the trailing edges of said incoming pulses, means combining only those of said first generated pulses and said trailing edge pulses which are synchronous, vacuum tube amplifier means responsive to said synchronously combined pulses so as to produce output pulses in response thereto, and multivibrator means connected to said first named vacuum tube means and responsive to said synchronously combined pulses for altering said time relation between first said generated pulses and said incoming pulses for a predetermined interval of time, said multivibrator means also holding said amplifier means inoperative except when said time relation is so altered.

4. A pulse group discriminator comprising, pulse width discriminator means comprising a first vacuum tube means generating in response to and for the duration of incoming pulses sawtooth pulses, a second vacuum tube means generating pulses in response to said sawtooth pulses exceeding a selectable amplitude, a third vacuum tube means for controlling said selectable amplitude, means generating pulses from the trailing edges of said incoming pulses, means combining only those of said trailing edge pulses and said pulses generated in response to said sawtooth pulses which are synchronous, vacuum tube amplifier means responsive to said synchronously combined pulses so as to produce output pulses in response thereto, and multivibrator means connected to said third vacuum tube means and responsive to said synchronously combined pulses for biasing said third vacuum tube means so as to cause said selectable amplitude to assume one of two values prior to the first of said synchronously combined pulses and the other of said two values in response to the first of said synchronously combined pulses, said multivibrator means also holding said amplifier means inoperative except when said selectable amplitude assumes said other of said two values.

5. A pulse group discriminator comprising, pulse width discriminator means comprising a first vacuum tube means generating in response to and for the duration of incoming pulses sawtooth pulses, a second vacuum tube means generating pulses in response to said sawtooth pulses exceeding a selectable amplitude, a third vacuum tube means for controlling said selectable amplitude, means generating pulses from the trailing edges of said incoming pulses, means combining only those of said trailing edge pulses and said pulses generated in response to said sawtooth pulses which are synchronous, vacuum tube amplifier means responsive to said synchronously combined pulses so as to produce output pulses in response thereto, and mutlivibrator means connected to said third vacuum tube means and responsive to said synchronously combined pulses for biasing said third vacuum tube means so as to cause said selectable amplitude to assume one of two values prior to the first of said synchronously combined pulses and the other of said two values for a predetermined interval of time in response to the first of said synchronously combined pulses, said multivibrator means also holding said amplifier means inoperative except when said selectable amplitude assumes said other of said two values.

6. A pulse group discriminator comprising, pulse width discriminator means comprising a first vacuum tube means generating, in response to and for the duration of incoming pulses, sawtooth pulses, a second vacuum tube means generating pulses in response to said sawtooth pulses exceeding a selectable amplitude, a third vacuum tube means for controlling said selectable amplitude, means generating pulses from the trailing edges of said incoming pulses, means combining only those of said trailing edge pulses and said pulses generated in response to said sawtooth pulses which are synchronous, vacuum tube amplifier means responsive to said synchronously combined pulses so as to produce output pulses in response thereto, multivibrator means connected to said third vacuum tube means and responsive to said synchronously combined pulses for biasing said third vacuum tube means so as to cause said selectable ampiltude to assume one of two values prior to the first of said synchronously combined pulses and the other of said two values for a predetermined interval of time in response to the first of said synchronously combined pulses, and resistance capacitance means responsive to said multivibrator means holding said amplifier means inoperative except during a predetermined part of said predetermined interval of time.

7. A pulse group discriminator comprising, pulse width discriminator means comprising a first vacuum tube means generating in response to and for the duration of incoming pulses sawtooth pulses, a second vacuum tube means generating pulses in response to said sawtooth pulses exceeding a selectable amplitude, a third vacuum tube means for controlling said selectable amplitude, means generating pulses from the trailing edges of said incoming pulses, a fourth vacuum tube means combining only those of said trailing edge pulses and said pulses generated by said second vacuum tube means which are synchronous, a fifth vacuum tube means generating pulses in response to said sawtooth pulses exceeding a predetermined amplitude, a sixth vacuum tube means combining only those of said trailing edge pulses and said pulses generated by said fifth vacuum tube means which are synchronous, and multivibrator means connected to said third vacuum tube means and responsive to said pulses combined by said fourth vacuum tube means for biasing said third vacuum tube means in response to the first of said pulses combined by said fourth vacuum tube means so as to cause said selectable amplitude to assume one of two values, said multivibrator means also holding said amplifier means inoperative except when said amplitude assumes said one of said two values, said mutlivibrator means also responsive to said pulses combined by said sixth vacuum tube means so as to bias said third vacuum tube means in response to last said pulses so as to cause said selectable amplitude to assume the other of said two values.

8. A pulse group discriminator comprising, vacuum tube means generating in response to incoming pulses pulses which are predeterminedly time related to said incoming pulses, means generating pulses from the trailing edges of said incoming pulses, means combining only those of said first generated pulses and said trailing edge pulses which are synchronous, and bias control means connected to said first named vacuum tube means and responsive to said synchronously combined pulses for altering said time relation between said first generated pulses and said incoming pulses.

CONRAD H. HOEPPNER.
CARL HARRISON SMITH, Jr.

No references cited.